United States Patent Office 2,731,360
Patented Jan. 17, 1956

2,731,360

METHOD FOR INCORPORATING A SOLID LUBRICANT INTO A POROUS METALLIC SURFACE

Phil Prince Love, Wembley, England, assignor to The Glacier Metal Company Limited, Wembley, England, a British company No Drawing. Application April 1, 1952, Serial No. 279,966

Claims priority, application Great Britain April 6, 1951

6 Claims. (Cl. 117—49)

This invention relates to an improved method of incorporating a solid non-metallic lubricating substance into a receptive metallic surface, and is applicable for the treatment of internal cylindrical surfaces, such as those of journal or like bearings, external cylindrical surfaces, such as those of journals or the like, and flat surfaces, such as those of thrust washers or other anti-friction elements, or of strip material or blanks for subsequent formation into plain bearing elements.

The invention is particularly applicable to bearings or anti-friction elements, including bearing elements, such as bushes, sleeves, liners, thrust washers or the like, journals and other rotatable members for coacting with plain bearing elements, sliding elements, such as machine tool slides, and elements of ball or roller bearings, and generally any elements having a metallic working surface which in use slides against another metal surface.

The vacuum impregnation of porous metal bodies and surfaces is a well-established method of incorporating filling material, such as lubricants, which are solid at ordinary temperatures but can be liquefied by heating to a moderate temperature. In some cases it has been proposed to include a substance, such as graphite in suspension in the liquefied solid lubricant, but this is difficult when the melting point of the solid lubricant is above 300° C.

The invention has for its object to provide an improved method whereby a solid lubricating substance, such as molybdenum disulphide, poly-tetra-fluoro-ethylene, lead di-iodide, boron nitride, graphite, soapstone, or the like, which cannot be liquefied at temperatures below 300° C., may be readily incorporated in a porous, creviced or other suitably receptive surface produced by sintering, etching, including selective etching, chemical or other process.

According to the present invention, the improved method for incorporating a solid non-metallic lubricating substance in a receptive metallic surface comprises removing air from the pores or crevices of the surface by application of sub-atmospheric pressure, applying the solid lubricating substance to the receptive surface in the form of a colloidal suspension in a volatile or vaporizable carrier liquid, restoring atmospheric pressure or applying super-atmospheric pressure to drive the suspension into the pores or crevices, evaporating the carrier liquid to leave the solid lubricant in the pores or crevices, repeating the cycle of treatment until the pores or crevices are substantially filled with the solid lubricant, and then burnishing the impregnated surface to compact the solid lubricating substance into the pores or crevices so as to fill all voids near the surface.

The burnishing treatment may be effected by the use of steel wool, agate or other known burnishing material, chosen as being adapted to compact the particular lubricating substance into the pores or crevices and generally to smooth the treated surface. Advantageously, the surface is subjected to a final treatment by a rolling or other pressing operation in order to densify the surface structure and to ensure tightly packed pores or crevices.

The solid lubricating substance may be applied in colloidal suspension in water or other suitable liquid. The impregnation treatment advantageously is carried out while the metallic element, the surface of which is being treated, is at a suitably elevated temperature to facilitate volatilization or evaporation of the carrier liquid. The final rolling or other pressing operation also may be carried out under suitable conditions involving, for instance, a temperature of about 340 to 360° C. in the case of a lubricating substance such as poly-tetra-fluoro-ethylene.

In carrying the invention into effect according to one embodiment, and in the application thereof to the treatment of a surface of a steel journal, the journal surface is subjected to a phosphating treatment to produce a suitably receptive surface. The journal element is inserted into an air-tight chamber from which air is extracted so as to reduce the pressure, for example, to one inch mercury or less. The journal, while being subjected to this partial vacuum, is immersed in a colloidal suspension of poly-tetra-fluoro-ethylene in the form of a "latex" and atmospheric pressure is restored to drive the suspension into the pores or crevices, and the journal element so treated is removed from the suspension and dried to evaporate the carrier liquid and leave particles of the solid lubricant in the pores or crevices. The treatment, comprising removing air by applying partial vacuum, applying the suspension, restoring atmospheric pressure or applying super-atmospheric pressure of, for example, 100 lbs. per sq. inch and drying to evaporate the carrier liquid, is repeated until all pores or crevices are substantially filled with the lubricating substance. Finally, any remaining voids in the surface are filled by compacting the deposited solid lubricant by means of a burnishing treatment, for instance, by the use of an agate burnisher, and finally may be subjected to a rolling treatment for the purpose before referred to.

In some cases, particularly when the substance supplied is poly-tetra-fluoro-ethylene, it may be advantageous to carry out the rolling operation by the use of a roller heated, for example, from 340 to 360° C. to facilitate flow of the material for filling the pores.

A journal treated in the manner above described can be employed effectively without other lubrication in conjunction with a cast iron or hardened steel bearing bush or liner.

Journal bearings or bearing liners, thrust washers or the like, provided with a porous or receptive working surface by a sintering, etching, partial etching, chemical or other treatment, may have a solid lubricating substance incorporated into the receptive surface in a similar manner to provide bearings suitable for use with steel or other journals or the like which preferably are finished to a high degree of surface smoothness, for example, 15 micro-inches or less, to secure best results.

The invention also may be applied for the incorporation of a solid lubricating substance into a receptive surface of strip material or of a blank which, after impregnation of the surface with the solid lubricating substance, may be formed into a bearing element in any suitable manner. Such strip material or blank may be of bi-metallic or multi-layer construction.

The invention also includes journals or the like or plain bearing or anti-friction elements having a porous or receptive surface impregnated with a solid lubricating substance by the method hereinbefore defined.

It will be understood that the invention is not limited to the particular embodiment hereinbefore described.

I claim:

1. A method for incorporating a solid non-metallic lubricant into a receptive metal surface comprising removing air from the surface by the application of sub-atmospheric pressure, thereafter applying the solid non-metallic lubricant to the receptive surface in the form of a colloidal suspension in a vaporizable carrier liquid, raising the pressure to drive the suspension into said surface, evaporating the carrier liquid to leave the solid lubricant in the receptive surface, repeating this cycle of treatment until the receptive surface is substantially filled with the solid lubricant, and then burnishing the impregnated surface to compact the solid lubricant therein.

2. A method for incorporating a solid non-metallic lubricant into a porous metallic surface comprising first removing air from the pores of the surface by the application of sub-atmospheric pressure, thereafter applying the solid non-metallic lubricant to the porous surface in the form of a colloidal suspension in a vaporizable carrier liquid, applying pressure at least equal to atmospheric pressure to drive the suspension into the pores of the surface, evaporating the carrier liquid to leave the solid lubricant in the pores, repeating this cycle of treatment until the pores are substantially filled with the solid lubricant, and then burnishing the impregnated surface to compact the solid lubricant into the pores so as to fill all voids near the surface.

3. A method for incorporating a solid non-metallic lubricant into a receptive metal surface comprising first removing air directly from the surface by the application of sub-atmospheric pressure, thereafter applying the solid non-metallic lubricant to the receptive surface in the form of a colloidal suspension in a vaporizable carrier liquid, raising the pressure to drive the suspension into said surface, evaporating the carrier liquid to leave the solid lubricant in the receptive surface, repeating this cycle of treatment until the receptive surface is substantially filled with the solid lubricant, burnishing the impregnated surface to compact the solid lubricant therein, and rolling the impregnated surface to densify the surface structure and insure tightly packed pores.

4. A method according to claim 1 wherein the receptive metal surface is maintained at an elevated temperature to facilitate evaporation of the carrier liquid.

5. A method according to claim 2, wherein the step of applying the solid lubricant to the porous surface in the form of a colloidal suspension is carried out while the porous surface is at an elevated temperature.

6. A method according to claim 3, wherein the rolling step is carried out at an elevated temperature.

References Cited in the file of this patent

UNITED STATES PATENTS

| | | |
|---|---|---|
| 1,187,746 | Kirchenbauer | June 20, 1916 |
| 1,214,630 | Wolf | Feb. 6, 1917 |
| 1,686,063 | Benbow | Oct. 2, 1928 |
| 1,964,671 | Nesbitt | June 26, 1934 |
| 2,225,815 | Acheson | Dec. 24, 1940 |
| 2,378,588 | Skehan | June 19, 1945 |
| 2,387,872 | Bell | Oct. 30, 1945 |